US010122508B2

United States Patent
Park et al.

(10) Patent No.: US 10,122,508 B2
(45) Date of Patent: Nov. 6, 2018

(54) METHOD AND APPARATUS FOR CONFIGURING A LONG TRAINING FIELD IN A WIRELESS LOCAL AREA NETWORK SYSTEM

(71) Applicant: LG ELECTRONICS INC., Seoul (KR)

(72) Inventors: Eunsung Park, Seoul (KR); Jinsoo Choi, Seoul (KR); Dongguk Lim, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 161 days.

(21) Appl. No.: 15/224,386

(22) Filed: Jul. 29, 2016

(65) Prior Publication Data

US 2017/0033914 A1 Feb. 2, 2017

Related U.S. Application Data

(60) Provisional application No. 62/199,243, filed on Jul. 31, 2015, provisional application No. 62/201,097, filed on Aug. 4, 2015, provisional application No. 62/210,398, filed on Aug. 26, 2015.

(51) Int. Cl.
H04W 72/04 (2009.01)
H04L 5/00 (2006.01)
H04L 27/26 (2006.01)

(52) U.S. Cl.
CPC .......... H04L 5/0048 (2013.01); H04L 5/0064 (2013.01); H04L 5/0091 (2013.01); H04L 27/2602 (2013.01); H04L 27/2613 (2013.01); H04L 5/0023 (2013.01); H04L 5/0032 (2013.01)

(58) Field of Classification Search
CPC ............. H04W 84/12; H04W 72/0413; H04W 72/0453; H04W 16/14; H04W 56/00; H04W 56/002; H04W 88/08; H04W 4/80; H04W 28/18
See application file for complete search history.

(56) References Cited

U.S. PATENT DOCUMENTS

| 9,615,291 | B2* | 4/2017 | Kenney | H04W 52/241 |
| 2011/0116401 | A1* | 5/2011 | Banerjea | H04W 74/0816 370/252 |
| 2015/0023272 | A1* | 1/2015 | Choi | H04L 27/2613 370/329 |

(Continued)

Primary Examiner — Mohamed A Kamara
(74) Attorney, Agent, or Firm — Lee Hong Degerman Kang & Waimey

(57) ABSTRACT

Proposed herein is a LTF sequence that is used in a wireless LAN system. The proposed LTF sequence may correspond to a sequence for a second frequency band of a second wireless LAN system. The proposed sequence may be generated through a LTF sequence that is used in a first wireless LAN system, which is different from the second wireless LAN system. The LTF sequence of the first wireless LAN system may correspond to a sequence for a first frequency band, which is different from the second frequency band. A length of an IDFT/DFT period and a bandwidth of a transmission frequency that are applied to the LTF sequence of the first wireless LAN system are different from a length of an IDFT/DFT period and a bandwidth of a transmission frequency that are applied to the LTF sequence of the second wireless LAN system.

7 Claims, 22 Drawing Sheets

(56) References Cited

U.S. PATENT DOCUMENTS

2015/0163028 A1* 6/2015 Tandra .................. H04L 5/0037
  370/203
2015/0312907 A1* 10/2015 Lee ..................... H04L 27/2085
  370/338

* cited by examiner

FIG. 1
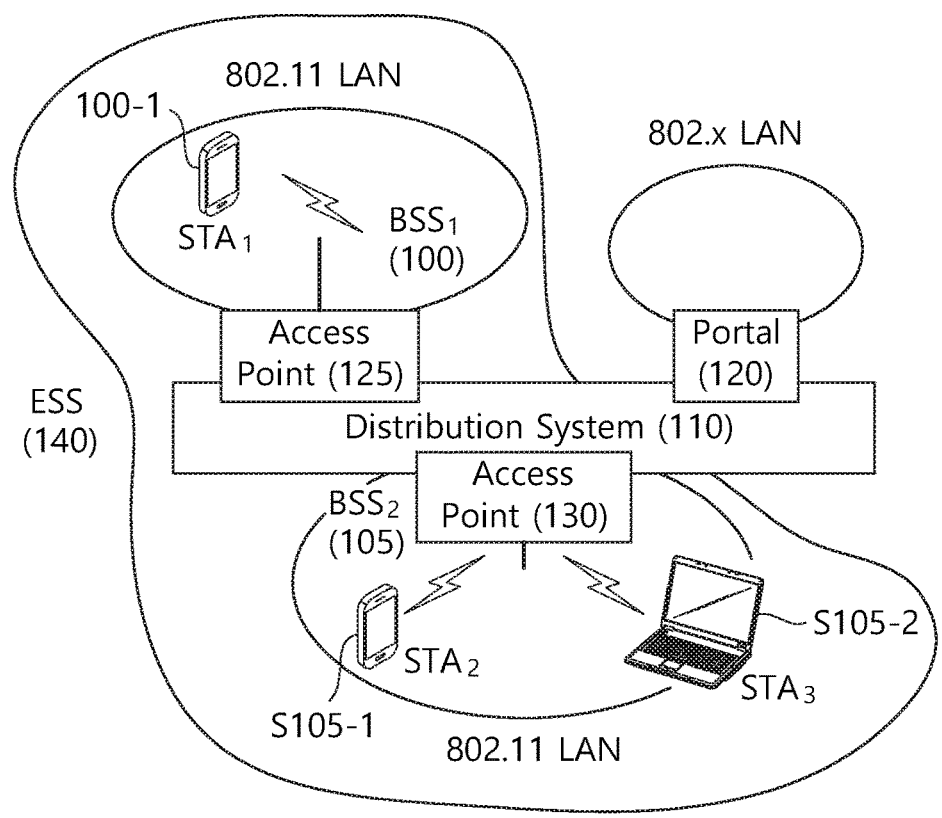
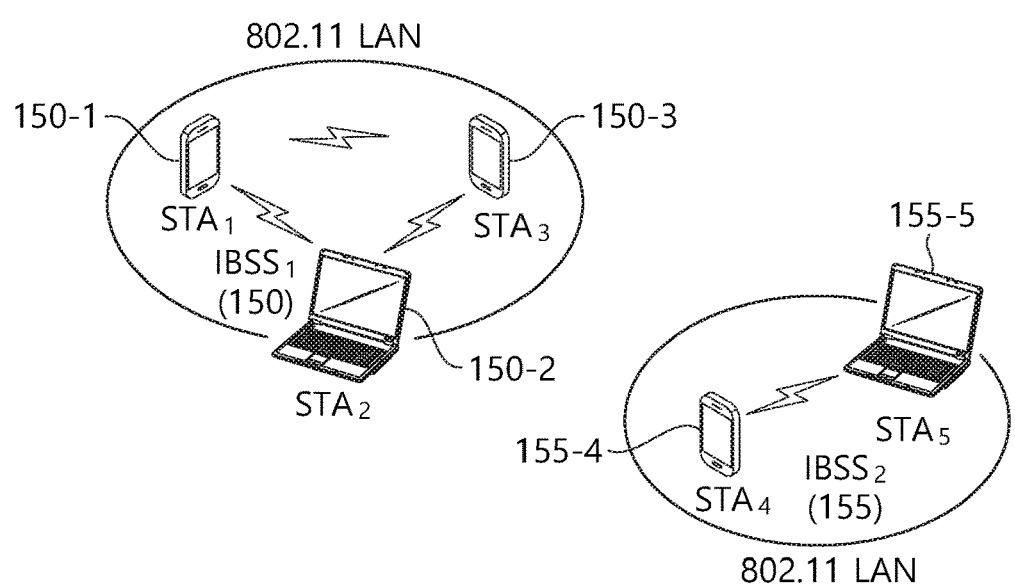

FIG. 13

| 5.85 | 5.85 | 5.34 | 4.75 | | 4.49 | 5.60 | 5.85 | 5.85 |
|---|---|---|---|---|---|---|---|---|
| 4.06 | | 5.07 | | 6.45 | 4.32 | | | 3.90 |
| | 6.21 | | | | 5.17 | | | |
| | | | | 5.11 | | | | |

| 5.85 | 5.85 | 3.91 | 5.17 | 6.16 | 6.21 |
| 5.85 | 4.93 | 4.27 | | | |
| 5.85 | | | | | |
| | | 7.43 | | | |
| 4.76 | | 5.13 | 6.33 | | |
| 5.90 | | | | | |
| 5.85 | | 4.07 | | | |
| 5.85 | | | | | |
| 5.85 | 5.85 | 3.91 | 5.17 | 6.11 | |
| 5.85 | 4.93 | 4.27 | | | |
| 5.85 | | | | | |
| | | 6.45 | | | |
| 4.76 | | 5.13 | 6.33 | | |
| 5.90 | | | | | |
| 5.85 | | 4.07 | | | |
| 5.85 | | | | | |

| 3.64 | 2.84 | 2.84 | 2.84 |  | 3.70 | 3.70 | 3.93 | 4.28 |
|---|---|---|---|---|---|---|---|---|
| 4.83 | | 5.85 | 5.85 | 5.05 | 5.85 | | 4.87 | |
| 4.16 | | | | | 4.47 | | | |
| 5.18 | | | | | | | | |

| 3.14 | 3.14 | 2.84 | 2.84 | | 3.94 | 3.94 | 3.94 | 5.76 | 4.69 | 3.09 | 2.84 | 2.84 | | 3.60 | 4.61 | 4.30 | 4.30 |
|---|---|---|---|---|---|---|---|---|---|---|---|---|---|---|---|---|---|
| 5.85 | | 5.85 | | 4.28 | 5.85 | | 7.43 | | 5.17 | | 5.85 | | 5.16 | 4.83 | | 5.85 | |
| | 3.59 | | | | 4.79 | | | 4.68 | | | | | 4.15 | | | |
| | | 6.24 | | | | | | 6.16 | | | | | | 5.62 | | | |

US 10,122,508 B2

METHOD AND APPARATUS FOR CONFIGURING A LONG TRAINING FIELD IN A WIRELESS LOCAL AREA NETWORK SYSTEM

CROSS-REFERENCE TO RELATED APPLICATION

The present application for patent claims priority to Provisional Application Nos. 62/199,243 filed on Jul. 31, 2015, 62/201,097 filed on Aug. 4, 2015, and 62/210,398 filed on Aug. 26, 2015, which are incorporated herein by reference.

BACKGROUND

Technical Field

The present invention relates to a training signal that is being used in a wireless LAN system and, more particularly, to a method and apparatus for configuring a Long Training Field (LTF) in a wireless LAN system.

Description of the Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY OF THE INVENTION

Technical Objects

This specification proposes an enhanced method related to a method and apparatus for configuring a training signal in a transmitting device in a wireless LAN system.

As an example of the present invention, the present invention proposes a method for transmitting a training signal of a second wireless LAN system by using a training signal that is being used in a first wireless LAN system.

Technical Solutions

An example of this specification may be applied to a transmitting apparatus of a wireless LAN system. The transmitting apparatus includes an AP or a non-AP STA.

The example of this specification includes a method for configuring and transmitting a LTF field.

The method according to this specification includes a step of configuring a long training field (LTF) for a second frequency band of a second wireless LAN system by using a LTF sequence for a first frequency band of a first wireless LAN system.

Additionally, the method according to this specification also includes a step of transmitting the LTF for the second frequency band through a Physical layer Protocol Data Unit (PPDU) including a first field area and a second field area.

The second field area may include the LTF and a data field for the second frequency band.

An Inverse Discrete Fourier Transform (IDFT)/Discrete Fourier Transform (DFT) period being applied to each symbol of the first field area may be configured to be shorter than an IDFT/DFT period being applied to each symbol of the second field area.

A bandwidth of the first frequency band may be configured to be larger than a bandwidth of the second frequency band.

BRIEF DESCRIPTION OF THE DRAWINGS

FIG. 1 is a conceptual view illustrating the structure of a wireless local area network (WLAN).

FIG. 13 illustrates a drawing indicating in units of resource units (RUs) a PAPR of a 4×HE-LTF sequence that is being used for a 20 MHz transmission.

FIG. 14 illustrates a drawing indicating in units of resource units (RUs) a PAPR of a 4×HE-LTF sequence that is being used for a 40 MHz transmission.

FIG. 15 illustrates a drawing indicating in units of resource units (RUs) a PAPR of a 4×HE-LTF sequence that is being used for a 80 MHz transmission.

FIG. 16 illustrates another drawing indicating in units of resource units (RUs) a PAPR of a 4×HE-LTF sequence that is being used for a 80 MHz transmission.

FIG. 17 illustrates a drawing indicating in units of resource units (RUs) a PAPR of a 2×HE-LTF sequence that is being used for a 20 MHz transmission.

FIG. 18 illustrates a drawing indicating in units of resource units (RUs) a PAPR of a 2×HE-LTF sequence that is being used for a 40 MHz transmission.

FIG. 19 illustrates a drawing indicating in units of resource units (RUs) a PAPR of a 2×HE-LTF sequence that is being used for a 80 MHz transmission.

FIG. 20 illustrates another drawing indicating in units of resource units (RUs) a PAPR of a 2×HE-LTF sequence that is being used for a 80 MHz transmission.

DESCRIPTION OF EXEMPLARY EMBODIMENTS

Figure 2:
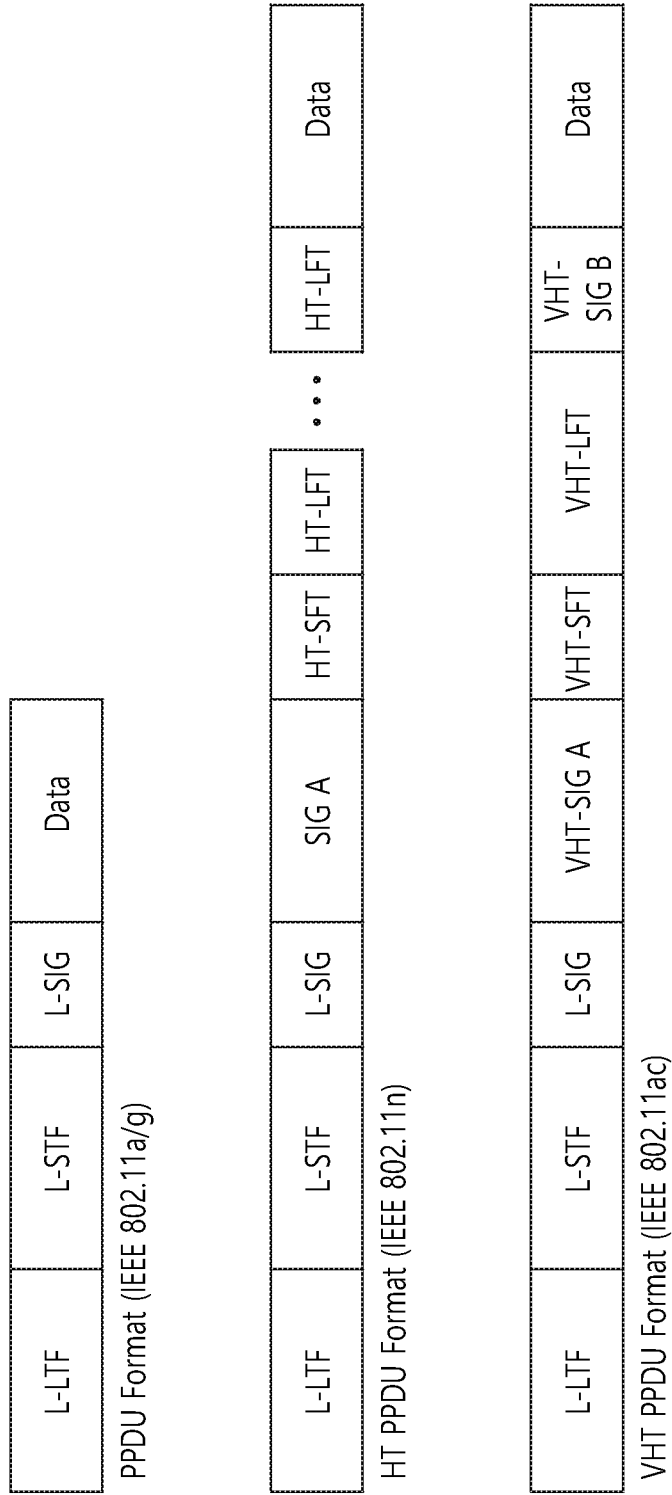
FIG. 2 is a diagram illustrating an example of a PPDU used in an IEEE standard.

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Meanwhile, the term user may be used in diverse meanings, for example, in wireless LAN communication, this term may be used to signify a STA participating in uplink MU MIMO and/or uplink OFDMA transmission. However, the meaning of this term will not be limited only to this.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
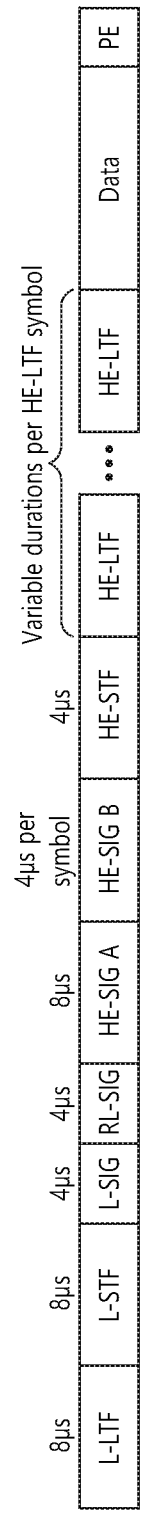
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 μs).

More detailed description of the respective fields of FIG. 3 will be made below.

Figure 4:
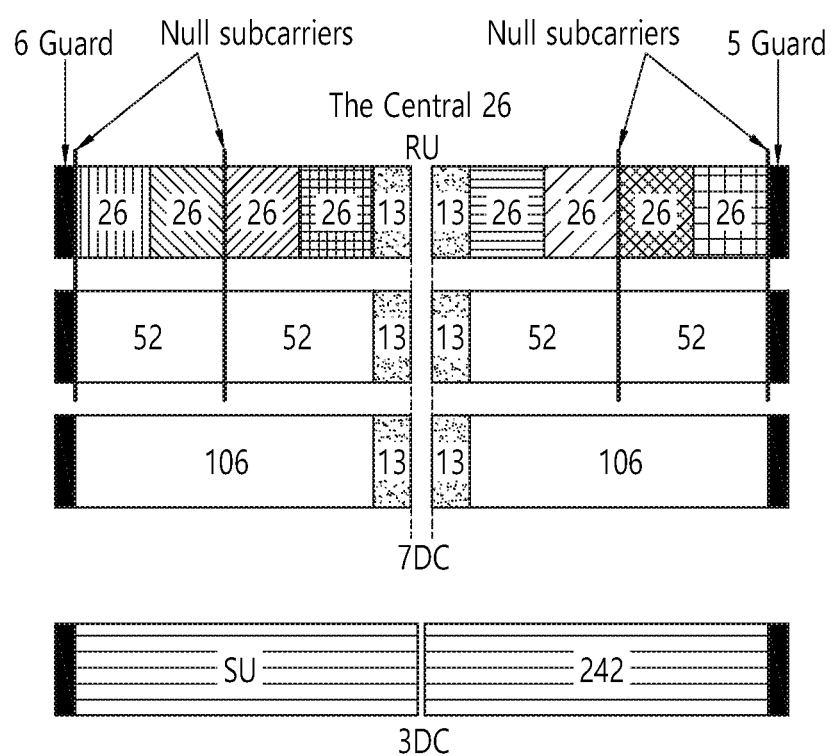

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated with respect to the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and in this case, as illustrated in a lowermost part of FIG. 4, one 242-unit may be used and in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
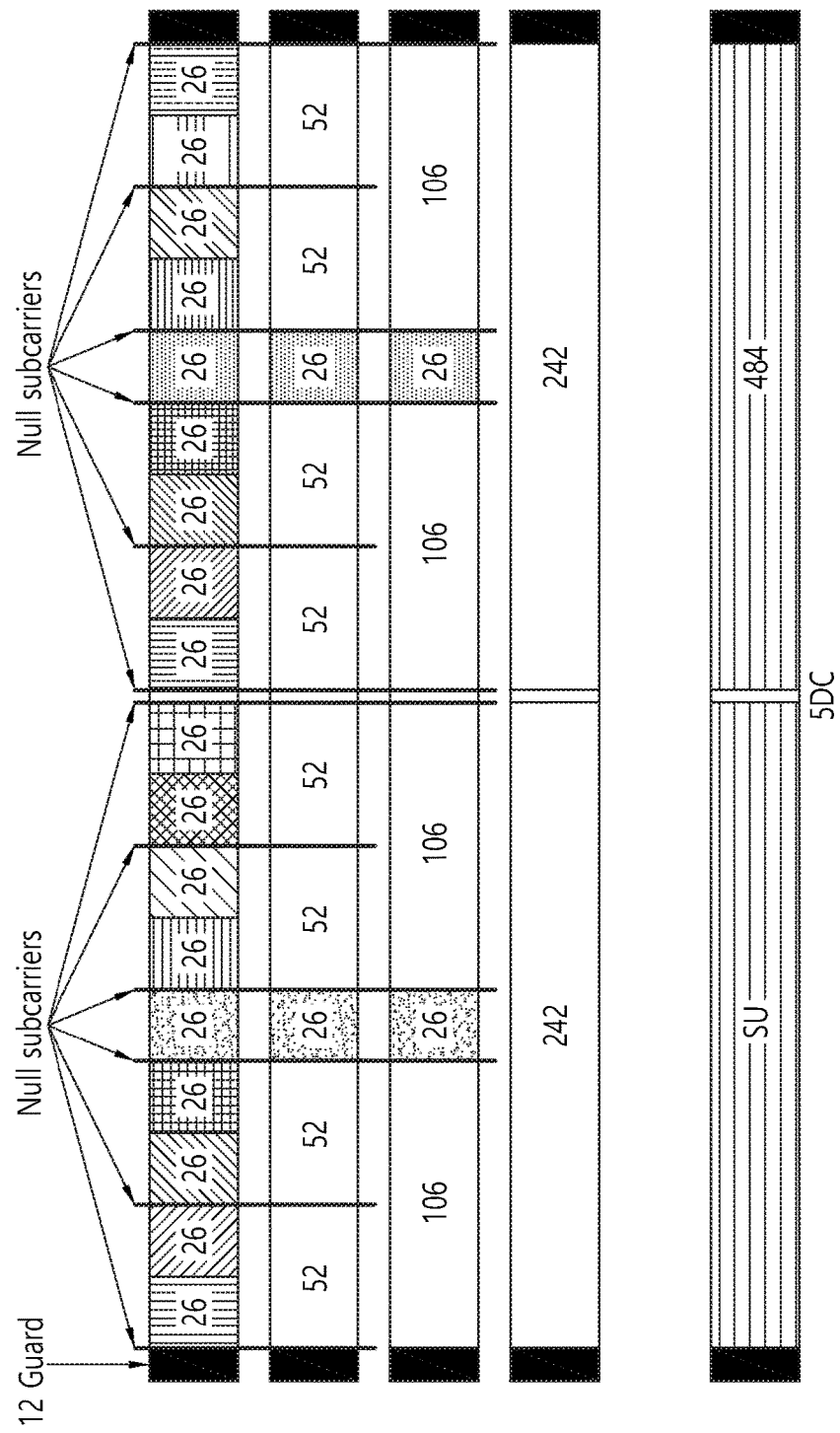
FIG. 5 is a diagram illustrating a layout of resource units (RUs) used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
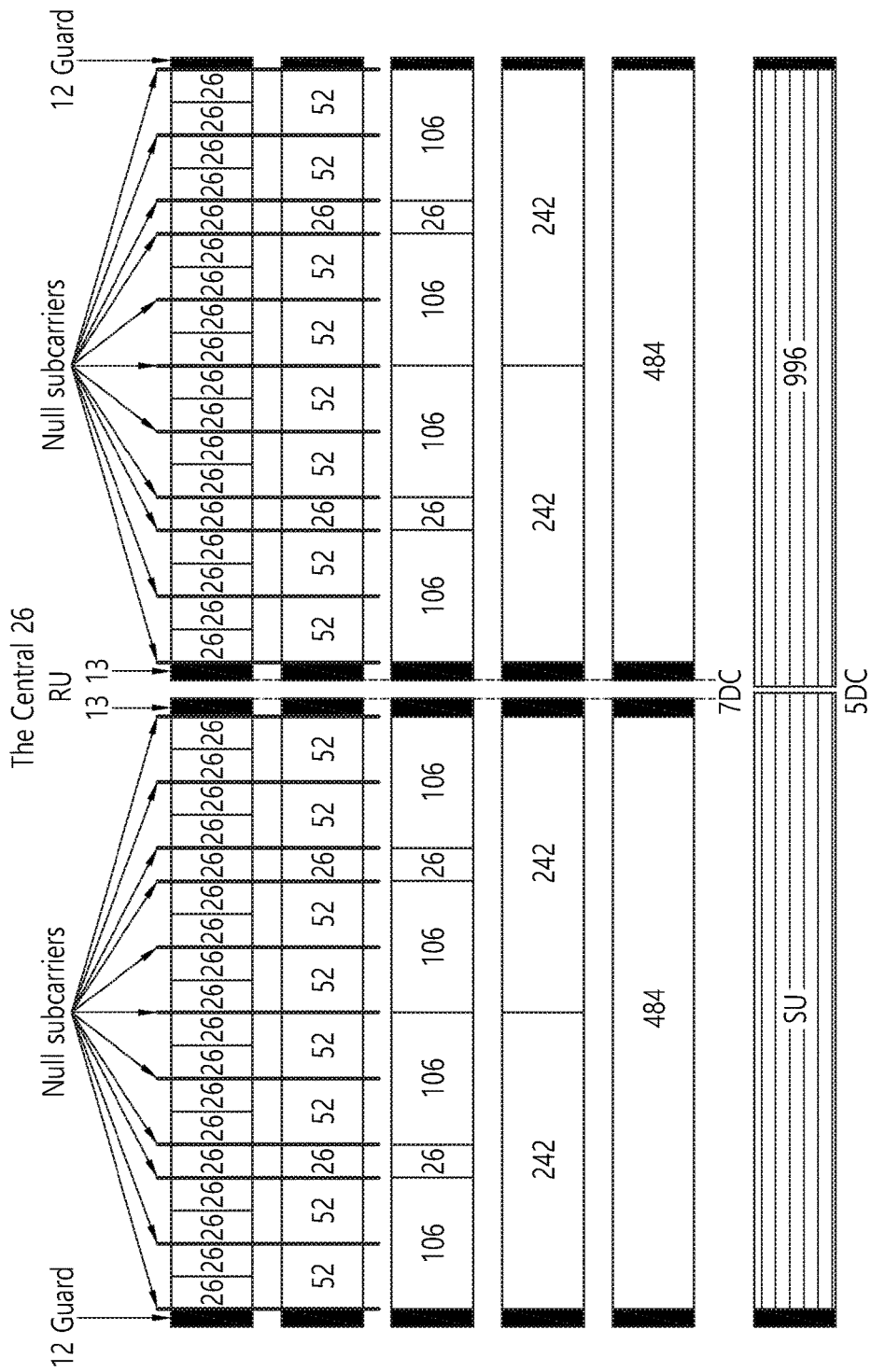
FIG. 6 is a diagram illustrating a layout of resource units (RUs) used in a band of 80 MHz.

FIG. 6 is a diagram illustrating a layout of resource units (RUs) used in a band of 80 MHz.

Similarly to a case in which the RUs having various RUs are used in one example of each of FIG. 4 or 5, 26-RU, 52-RU, 106-RU, 242-RU, 484-RU, and the like may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and in this case, 5 DC tones may be inserted. Meanwhile, the detailed number of RUs may be modified similarly to one example of each of FIG. 4 or 5.

Figure 7:
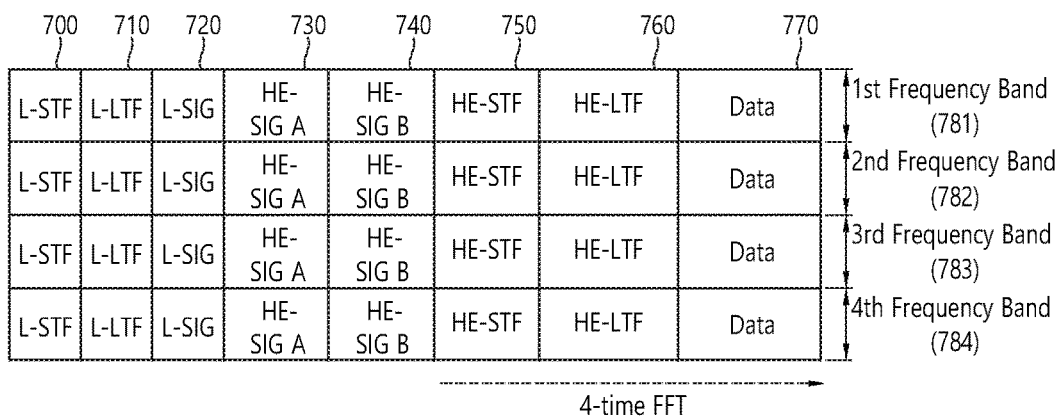
FIG. 7 is a diagram illustrating another example of the HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF 700 may include a short training orthogonal frequency division multiplexing (OFDM) symbol. The L-STF 700 may be used for frame detection, automatic gain control (AGC), diversity detection, and coarse frequency/time synchronization.

An L-LTF 710 may include a long training orthogonal frequency division multiplexing (OFDM) symbol. The L-LTF 710 may be used for fine frequency/time synchronization and channel prediction.

An L-SIG 720 may be used for transmitting control information. The L-SIG 720 may include information regarding a data rate and a data length. Further, the L-SIG 720 may be repeatedly transmitted. That is, a new format, in which the L-SIG 720 is repeated (for example, may be referred to as R-LSIG) may be configured.

An HE-SIG-A 730 may include the control information common to the receiving station.

In detail, the HE-SIG-A 730 may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment.

An HE-SIG-B 740 may be included only in the case of the PPDU for the multiple users (MUs) as described above. Principally, an HE-SIG-A 750 or an HE-SIG-B 760 may include resource allocation information (alternatively, virtual resource allocation information) for at least one receiving STA.

Figure 8:
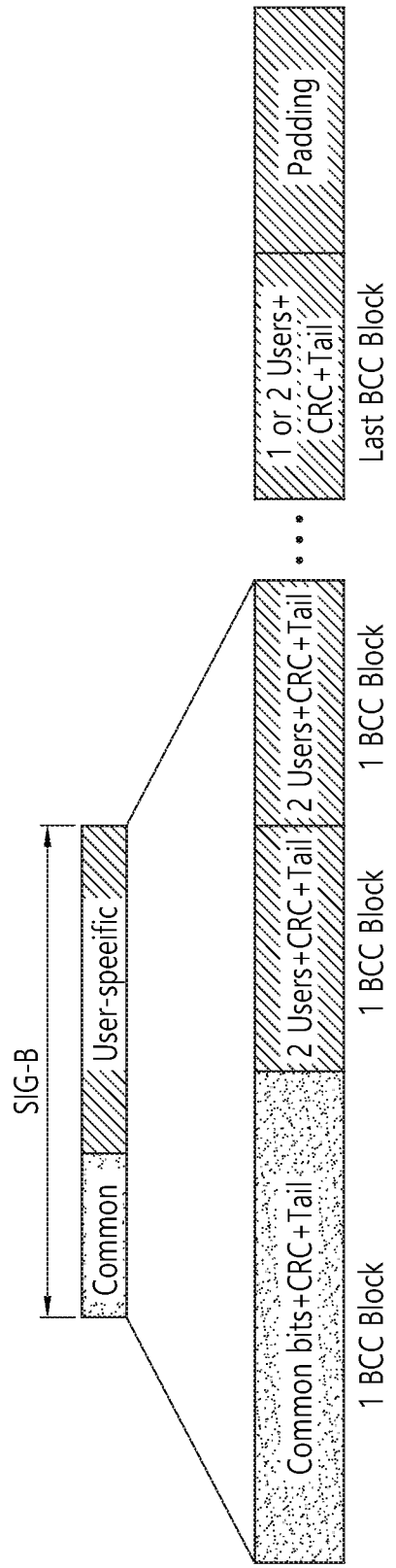
FIG. 8 is a block diagram illustrating one example of HE-SIG-B according to an embodiment.

FIG. 8 is a block diagram illustrating one example of HE-SIG-B according to an embodiment.

As illustrated in FIG. 8, the HE-SIG-B field includes a common field at a frontmost part and the corresponding common field is separated from a field which follows therebehind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 8.

A previous field of the HE-SIG-B 740 may be transmitted in a duplicated form on an MU PPDU. In the case of the HE-SIG-B 740, the HE-SIG-B 740 transmitted in some frequency band (e.g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B 740 in a specific frequency band (e.g., the second frequency band) is duplicated with the HE-SIG-B 740 of another frequency band (e.g., the fourth frequency band). Alternatively, the HE-SIG B 740 may be transmitted in an encoded form on all transmission resources. A field after the HE-SIG B 740 may include individual information for respective receiving STAs receiving the PPDU.

The HE-STF 750 may be used for improving automatic gain control estimation in a multiple input multiple output (MIMO) environment or an OFDMA environment.

The HE-LTF 760 may be used for estimating a channel in the MIMO environment or the OFDMA environment.

The size of fast Fourier transform (FFT)/inverse fast Fourier transform (IFFT) applied to the HE-STF 750 and the field after the HE-STF 750, and the size of the FFT/IFFT applied to the field before the HE-STF 750 may be different from each other. For example, the size of the FFT/IFFT applied to the HE-STF 750 and the field after the HE-STF 750 may be four times larger than the size of the FFT/IFFT applied to the field before the HE-STF 750.

For example, when at least one field of the L-STF 700, the L-LTF 710, the L-SIG 720, the HE-SIG-A 730, and the HE-SIG-B 740 on the PPDU of FIG. 7 is referred to as a first field, at least one of the data field 770, the HE-STF 750, and the HE-LTF 760 may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy wireless LAN system. That is, the FFT/IFFT having the size may be applied, which is N (=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N (=4) times shorter than the IDFT/DFT period applied to each data symbol of the second field. That is, the IDFT/DFT length applied to each symbol of the first field of the HE PPDU may be expressed as 3.2 μs and the IDFT/DFT length applied to each symbol of the second field of the HE PPDU may be expressed as 3.2 μs*4 (=12.8 μs). The length of the OFDM symbol may be a value acquired by adding the length of a guard interval (GI) to the IDFT/DFT length. The length of the GI may have various values such as 0.4 μs, 0.8 μs, 1.6 μs, 2.4 μs, and 3.2 μs.

For simplicity in the description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user (e.g., a receiving station) may receive the HE-SIG-A 730 and may be instructed to receive the downlink PPDU based on the HE-SIG-A 730. In this case, the STA may perform decoding based on the FFT size changed from the HE-STF 750 and the field after the HE-STF 750. On the contrary, when the STA may not be instructed to receive the downlink PPDU based on the HE-SIG-A 730, the STA may stop the decoding and configure a network allocation vector (NAV). A cyclic prefix (CP) of the HE-STF 750 may have a larger size than the CP of another field and the during the CP period, the STA may perform the decoding for the downlink PPDU by changing the FFT size.

Hereinafter, in the embodiment of the present invention, data (alternatively, or a frame) which the AP transmits to the STA may be expressed as a terms called downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the wireless LAN system to which the embodiment of the present description is applied, the whole bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, when the uplink transmission by the plurality of respective STAs (e.g., non-AP STAs) is performed on the frequency domain, the AP may allocate the different frequency resources to the plurality of respective STAs as the uplink transmission resources based on the OFDMA. Further, as described above, the different frequency resources may be different subbands (alternatively, sub channels) or different resources units (RUs).

The different frequency resources are indicated through a trigger frame with respect to the plurality of respective STAs.

Figure 9:
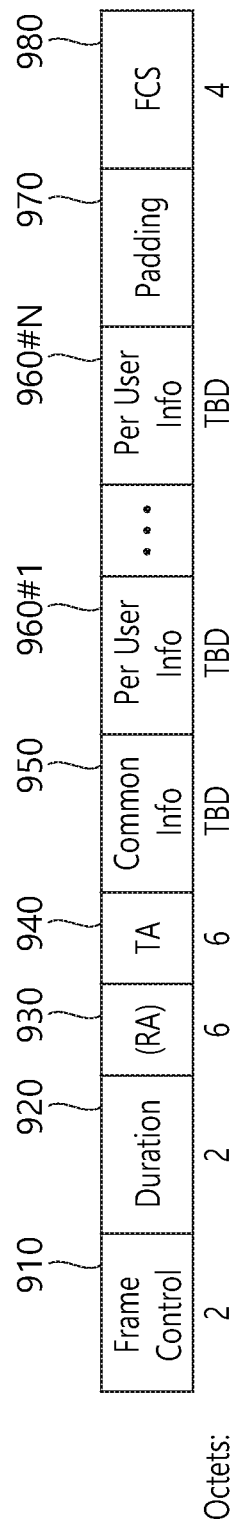
FIG. 9 illustrates an example of a trigger frame.

FIG. 9 illustrates an example of a trigger frame. The trigger frame of FIG. 9 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 9 may be partially omitted, or other fields may be added. Moreover, the length of each field may be varied differently as shown in the drawing.

A Frame Control field 910 shown in FIG. 9 may include information related to a version of the MAC protocol and other additional control information, and a Duration field 920 may include time information for configuring a NAV or information related to an identifier (e.g., AID) of the user equipment.

Additionally, a RA field 930 may include address information of a receiving STA of the corresponding trigger frame, and this field may also be omitted as required. A TA field 940 may include address information of the STA (e.g., AP) transmitting the corresponding trigger frame, and a common information field 950 may include common control information that is applied to the receiving STA receiving the corresponding trigger frame.

Figure 10:
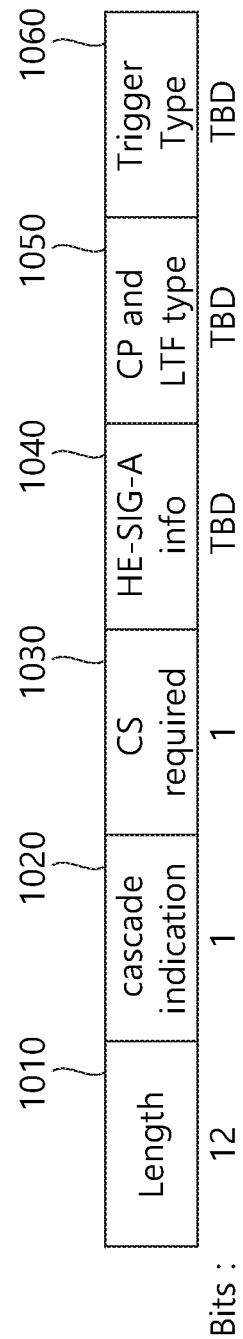
FIG. 10 illustrates an example of a common information field.

FIG. 10 illustrates an example of a common information field. Among the sub-fields of FIG. 10, some may be omitted, and other additional sub-fields may also be added. Additionally, the length of each of the sub-fields shown in the drawing may be varied.

As shown in the drawing, the Length field 1010 may be given that same value as the Length field of the L-SIG field of the uplink PPDU, which is transmitted with respect to the corresponding trigger frame, and the Length field of the L-SIG field of the uplink PPDU indicates the length of the uplink PPDU. As a result, the Length field 1010 of the trigger frame may be used for indicating the length of its respective uplink PPDU.

Additionally, a Cascade Indicator field 1020 indicates whether or not a cascade operation is performed. The cascade operation refers to a downlink MU transmission and an uplink MU transmission being performed simultaneously within the same TXOP. More specifically, this refers to a case when a downlink MU transmission is first performed, and, then, after a predetermined period of time (e.g., SIFS), an uplink MU transmission is performed. During the cascade operation, only one transmitting device performing downlink communication (e.g., AP) may exist, and multiple transmitting devices performing uplink communication (e.g., non-AP) may exist.

A CS Request field 1030 indicates whether or not the status or NAV of a wireless medium is required to be considered in a situation where a receiving device that has received the corresponding trigger frame transmits the respective uplink PPDU.

A HE-SIG-A information field 1040 may include information controlling the content of a SIG-A field (i.e., HE-SIG-A field) of an uplink PPDU, which is being transmitted with respect to the corresponding trigger frame.

A CP and LTF type field 1050 may include information on a LTF length and a CP length of the uplink PPDU being transmitted with respect to the corresponding trigger frame. A trigger type field 1060 may indicate a purpose for which the corresponding trigger frame is being used, e.g., general triggering, triggering for beamforming, and so on, a request for a Block ACK/NACK, and so on.

Meanwhile, the remaining description on FIG. 9 will be additionally provided as described below.

It is preferable that the trigger frame includes per user information fields 960#1 to 960#N corresponding to the number of receiving STAs receiving the trigger frame of FIG. 9. The per user information field may also be referred to as a "RU Allocation field".

Additionally, the trigger frame of FIG. 9 may include a Padding field 970 and a Sequence field 980.

It is preferable that each of the per user information fields 960#1 to 960#N shown in FIG. 9 further includes multiple sub-fields.

Figure 11:
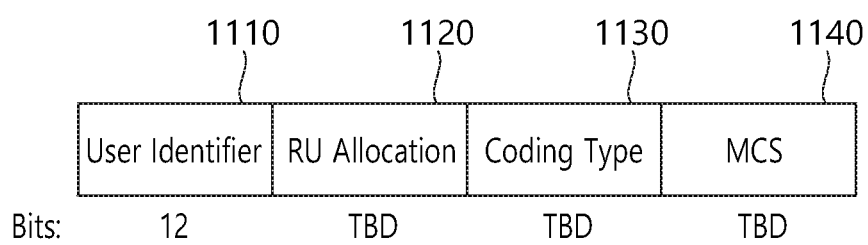
FIG. 11 illustrates an example of a sub-field being included in a per user information field.

FIG. 11 illustrates an example of a sub-field being included in a per user information field. Among the sub-fields of FIG. 11, some may be omitted, and other additional sub-fields may also be added. Additionally, the length of each of the sub-fields shown in the drawing may be varied.

A User Identifier field 1110 indicates an identifier of an STA (i.e., receiving STA) to which the per user information corresponds, and an example of the identifier may correspond to all or part of the AID.

Additionally, a RU Allocation field 1120 may be included in the sub-field of the per user information field. More specifically, in case a receiving STA, which is identified by the User Identifier field 1110, transmits an uplink PPDU with respect to the trigger frame of FIG. 9, the corresponding uplink PPDU is transmitted through the RU, which is indicated by the RU Allocation field 1120. In this case, it is preferable that the RU that is being indicated by the RU Allocation field 1120 corresponds to the RU shown in FIG. 4, FIG. 5, and FIG. 6.

The sub-field of FIG. 11 may include a Coding Type field 1130. The Coding Type field 1130 may indicate a coding type of the uplink PPDU being transmitted with respect to the trigger frame of FIG. 9. For example, in case BBC coding is applied to the uplink PPDU, the Coding Type field 1130 may be set to '1', and, in case LDPC coding is applied to the uplink PPDU, the Coding Type field 1130 may be set to '0'.

Additionally, the sub-field of FIG. 11 may include a MCS field 1140. The MCS field 1140 may indicate a MCS scheme being applied to the uplink PPDU that is transmitted with respect to the trigger frame of FIG. 9.

Figure 12:
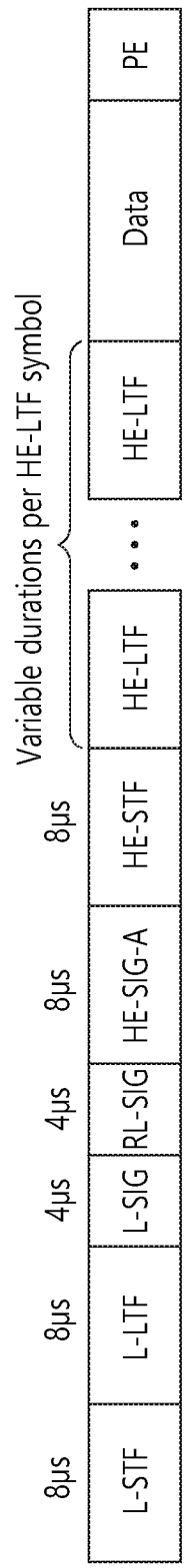
FIG. 12 is a block diagram illustrating an example of an uplink MU PPDU.

FIG. 12 is a block diagram illustrating an example of an uplink MU PPDU. The uplink MU PPDU of FIG. 12 may be transmitted with respect to the above-described trigger frame.

As shown in the drawing, the PPDU of FIG. 12 includes diverse fields, and the fields included herein respectively correspond to the fields shown in FIG. 2, FIG. 3, and FIG. 7. Meanwhile, as shown in the drawing, the uplink PPDU of FIG. 12 may not include a HE-SIG-B field and may only include a HE-SIG-A field.

In the related art wireless LAN system, the P matrix (or orthogonal mapping matrix) that is being applied to the LTF field has been defined as described below.

More specifically, in the 802.11ac system, residual carrier frequency offset (CFO) is measured by using a pilot. More specifically, residual CFO may be measured by allocating the same pilot to the same tone (or subcarrier) for each symbol, by configuring the same coefficient, and by measuring a phase difference in the pilot values between the symbols.

Additionally, the channel estimation is carried out in the VHT-LTF, and orthogonality between the symbols of the same subcarrier and the streams is created by multiplying a P matrix, and, then, the channel may be measured by using the orthogonality. The P matrix may represent a matrix having orthogonality for each row configuring the corresponding matrix.

In this case, the number of LTF fields and the total number of spatial streams (i.e., space-time streams) may be defined as the relationship shown below in Table 1.

TABLE 1

|  | Number of streams | | | | | | | |
|---|---|---|---|---|---|---|---|---|
|  | 1 | 2 | 3 | 4 | 5 | 6 | 7 | 8 |
| Number of LTFs | 1 | 2 | 4 | 4 | 6 | 6 | 8 | 8 |

Meanwhile, the P matrix may be defined as different matrices in accordance with the total number of space-time streams, and the detailed format of the matrix may be as described below. More specifically, if the total number of space-time streams is equal to or less than 4, Equation 1 is used, and, if the total number of space-time streams is equal to 5 or 6, Equation 2 is used, and, if the total number of space-time streams is equal to 7 or 8, Equation 3 is used.

$$P_{4\times 4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix} \quad \langle \text{Equation 1} \rangle$$

$$P_{6\times 6} = \begin{bmatrix} 1 & -1 & 1 & 1 & 1 & -1 \\ 1 & -w^1 & w^2 & w^3 & w^4 & -w^5 \\ 1 & -w^2 & w^4 & w^6 & w^8 & -w^{10} \\ 1 & -w^3 & w^6 & w^9 & w^{12} & -w^{15} \\ 1 & -w^4 & w^8 & w^{12} & w^{16} & -w^{20} \\ 1 & -w^5 & w^{10} & w^{15} & w^{20} & -w^{25} \end{bmatrix} \quad \langle \text{Equation 2} \rangle$$

where
$w = \exp(-j2\pi/6)$ $$P_{8\times 8} = \begin{bmatrix} P_{4\times 4} & P_{4\times 4} \\ P_{4\times 4} & -P_{4\times 4} \end{bmatrix} \quad \langle \text{Equation 3} \rangle$$

For example, in the IEEE 802.11ac system, in case Equation 1 is used in order to configure the VHT-LTF field, a method in which i) a first LTF symbol of a first space-time stream is multiplied by "1", a second LTF symbol is multiplied by "−1", and the remaining two LTF symbols are multiplied by "1", ii) first, second, and fourth LTF symbols of a second space-time stream are multiplied by "1", and a third LTF symbol is multiplied by "−1", iii) first, second, and third LTF symbols of a third space-time stream are multiplied by "1", and a fourth LTF symbol is multiplied by "−1", and iv) second, third, and fourth LTF symbols of a fourth space-time stream are multiplied by "1", and a first LTF symbol is multiplied by "−1", may be used.

More specifically, the LTF sequence by which the P matrix is multiplied is defined as a binary sequence that is shown below.

More specifically, LTF_left and LTF_right sequences are defined as shown below.

LTF_left={1,1,−1,−1,1,1,−1,1,−,1,1,1,1,1,1,−1,−1,1, 1,−1,1,−1,1,1,1,1}    <Equation 4>

LTF_right={1,−1,−1,1,1,−1,1,−1,1,−1,−1,−1,−1,1, 1,−1,−1,1,−1,1,−1,1,1,1}    <Equation 5>

In the VHT system, a VHT-LTF sequence for a 20 MHz transmission is defined as shown below.

VHTLTF_20(−28,28)={1,1,LTF_left,0,LTF_right,− 1,−1}    <Equation 6>

More specifically, the frequency band for the 20 MHz transmission corresponds to frequency indexes "−28" to "28", and, as shown in Equation 6, the frequency band is defined as the LTF_left and LTF_right sequences, additional binary values, and a DC value "0".

In the VHT system, a VHT-LTF sequence for a 40 MHz transmission is defined as shown below.

VHTLTF_40(−58,58)={LTF_left,1,LTF_right,−1,−1,− 1,1,0,0,0,−1,1,1,−1,LTF_left,1,LTF_right}    <Equation 7>

More specifically, the frequency band for the 40 MHz transmission corresponds to frequency indexes "−58" to "58", and, as shown in Equation 7, the frequency band is defined as the LTF_left and LTF_right sequences, additional binary values, and a DC value "0".

In the VHT system, a VHT-LTF sequence for a 40 MHz transmission is defined as shown below.

In the VHT system, a VHT-LTF sequence for a 80 MHz transmission is defined as shown below.

VHTLTF_80(−122,122)={LTF_left,1,LTF_right,−1,− 1,−1,1,1,−1,1,−1,1,1,−1,LTF_left,1,LTF_right,1,− 1,1,−1,0,0,0,1,−1,−1,1,LTF_left,1,LTF_right,−1,− 1,−1,1,1,−1,1,−1,1,1,−1,LTF_left,1,LTF_right}    <Equation 8>

More specifically, the frequency band for the 80 MHz transmission corresponds to frequency indexes "−122" to "122", and, as shown in Equation 8, the frequency band is defined as the LTF_left and LTF_right sequences, additional binary values, and a DC value "0".

In the VHT system, a VHT-LTF sequence for a 160 MHz transmission is defined as shown below.

VHTLTF_160(−250,250)={VHTLTF(−122,122),0,0, 0,0,0,0,0,0,0,0,0,VHTLTF(−122,122)}    <Equation 9>

More specifically, the frequency band for the 160 MHz transmission corresponds to frequency indexes "−250" to "250", and, as shown in Equation 9, the frequency band is defined as a structure of repeating the VHT-LTF sequence for the 80 MHz transmission.

In the following example, an example of the above-described Equation 4 to Equation 9 may be re-used for the HE-LTF sequence. In this case, the VHT-LTF sequence that is being re-used may correspond to a sequence having a gamma value applied thereto or may correspond to a sequence not having a gamma value applied thereto. For example, in the VHT system, for a decrease in PAPR of a STF or LTF, an operation of rotating a tone by using an orthogonal sequence, such as {1,j}, {1, −1}, and so on, may be performed. Hereinafter, the sequences VHTLTF_20, VHTLTF_40, VHTLTF_80, VHTLTF_160, and so on, which are being applied to the following equations, may each correspond to a sequence having a gamma value applied thereto or a sequence not having a gamma value applied thereto.

Hereinafter, in this specification, a HELTF sequence that is available for usage in a HE PPDU will be proposed. As shown in FIG. 7, and so on, not only 1×FFT but also 2×FFT or 4×FFT may be applied to a HE-LTF 760. More specifically, as compared to a legacy field of the HE PPDU, a FFT/IFFT having a size that is 2 or 4 times larger may be applied, and, accordingly, the subcarrier spacing may be ½ times or ¼ times the subcarrier spacing that was used in the conventional wireless LAN system.

More specifically, an IEEE802.11ax system or a HEW system may use a HE-LTF having a length that is 2 times or 4 times longer for each bandwidth as compared with the conventional 11ac system or VHT system. In the following specification, a method of designing a HE-LTF sequence by re-using the VHT-LTF sequence of the conventional 11ac system as much as possible will be proposed.

Example (1)—4×HE-LTF

Hereinafter, an example of a 4×HE-LTF will be proposed. More specifically, Example (1), which will hereinafter be described in detail, proposes diverse types of LTF sequences for the 20 MHz, 40 MHz, and 80 MHz transmissions.

1-A) 20 MHz

In case of the 4×HE LTF, as compared to the VHT LTF, since the size of the FFT block being applied herein has been increased to a size that is 4 times larger, even if a HE LTF for a 20 MHz transmission is used, the VHT LTF for a 80 MHz transmission may be re-used.

More specifically, the VHT LTF sequence for the 80 MHz transmission corresponds to frequency indexes "−122" to "122", and since this will the same for the 4×HE LTF for the 20 MHz transmission, the 4×HE LTF sequence for the 20 MHz transmission may be defined as the equation shown below.

HELTF_4×,20(−122:1:122)=VHTLTF_80(−122:1: 122)    <Equation 10>

In the equation, "(−122:1:122)" signifies that a sequence is being inserted at a frequency index interval of "1" starting from frequency index "−122" to frequency index "122". Additionally, "VHTLTF_80" signifies a VHTLTF sequence for a 80 MHz transmission, and "HELTF_4×,20" signifies 4×HELTF among the HELTF sequences for the 20 MHz transmission. The above-described indication method may be identically applied to the equations shown below.

As shown below, this example may be modified by using a method of inserting a DC index and a sequence element "0" in each of the left and right indexes of the DC index. additionally, the VHTLTF sequence may also be multiplied by C1 and C2 values. Each of the C1 and C2 values may, for example, respectively correspond to BPSK values (i.e., "1" and "−1") and may be optimized based on the PAPR. Additionally, in the following equation, the positions of VHTLTF_80(−122:1:−2) and VHTLTF_80(2:1:122) may vary and may be optimized with respect to the PAPR. In this case, the length of the HELTF sequence being configured on each of the left side and the right side with respect to the DC index may each be equal to 121.

$$\text{HELTF\_4x,20}(-122{:}1{:}122)=\{c1*\text{VHTLTF\_80}(-122{:}1{:}-2),0,0,0,c2*\text{VHTLTF\_80}(2{:}1{:}122)\} \quad \text{<Equation 11>}$$

Meanwhile, among the HELTF sequences, a sequence corresponding to a left side area of the DC index (i.e., an area corresponding to a frequency index having a negative number) is referred to as a negative sequence, and a sequence corresponding to a right side area of the DC index (i.e., an area corresponding to a frequency index having a positive number) is referred to as a positive sequence.

1-B) 40 MHz

The length respective to each of the negative and positive sequences for HELTF_4x,40 may each be equal to 242. In this case, the HELTF_4x,20 (or VHTLTF_80) may be repeated twice, so as to configure HELTF_4x,40. The respective example is shown below in detail.

$$\text{HELTF\_4x,40}(-244{:}1{:}244)=\{c1*\text{VHTLTF\_4x,20}(-122{:}1{:}-2),c2*\text{VHTLTF\_4x,20}(2{:}1{:}122),0,0,0,0,0,c3*\text{VHTLTF\_4x,20}(-122{:}1{:}-2),c4*\text{VHTLTF\_4x,20}(2{:}1{:}122)\} \quad \text{<Equation 12>}$$

The fact that each of C1 to C4 may correspond to a BPSK value (i.e., "1" and "−1") and that each of C1 to C4 may be optimized based on the PAPR is the same as the above-described example. Additionally, the fact that the detailed positions of VHTLTF_4x,20(−122:1:−2) and VHTLTF_4x,20(2:1:122) may be varied and that the detailed positions may be optimized based on the PAPR is also the same as the above-described example.

1-C) 80 MHz

The length respective to each of the negative and positive sequences for HELTF_4x,80 may each be equal to 498. In this case, the HELTF_4x,20 (or VHTLTF_80) may be repeated four times, so as to configure HELTF_4x,80. Additionally, 14 extra values may be used herein. The respective example is shown below in detail.

$$\text{HELTF\_4x,80}(-500{:}1{:}500)=\{c1*\text{VHTLTF\_4x,20}(-122{:}1{:}-2),c2*\text{VHTLTF\_4x,20}(2{:}1{:}122),\\c3*\text{VHTLTF\_4x,20}(-122{:}1{:}-2),\\c4*\text{VHTLTF\_4x,20}(2{:}1{:}122),a1,a2,\ldots,a14,0,\\0,0,0,0,a15,a16,\ldots,a28,c5*\text{VHTLTF\_4x,20}(-122{:}1{:}-2),c6*\text{VHTLTF\_4x,20}(2{:}1{:}122),\\c7*\text{VHTLTF\_4x,20}(-122{:}1{:}-2),\\c8*\text{VHTLTF\_4x,20}(2{:}1{:}122)\} \quad \text{<Equation 13>}$$

The fact that each of C1 to C8 may correspond to a BPSK value (i.e., "1" and "−1") and that each of C1 to C8 may be optimized based on the PAPR is the same as the above-described example. The fact that the detailed positions of VHTLTF_4x,20(−122:1:−2), VHTLTF_4x,20(2:1:122), and a1 to a28 may be varied and that the detailed positions may be optimized based on the PAPR is also the same as the above-described example. Such detailed exemplary modification is as shown below. More specifically, it will be preferable to design the sequence based on left-and-right orthogonality.

$$\text{HELTF\_4x,80}(-500{:}1{:}500)=\{c1*\text{VHTLTF\_4x,20}(-122{:}1{:}-2),c2*\text{VHTLTF\_4x,20}(2{:}1{:}122),a1,a2,\\c3*\text{VHTLTF\_4x,20}(-122{:}1{:}-2),\\c4*\text{VHTLTF\_4x,20}(2{:}1{:}122),a3,a4,\ldots,a14,0,\\0,0,0,0,a15,a16,\ldots,a26,c5*\text{VHTLTF\_4x,20}(-122{:}1{:}-2),c6*\text{VHTLTF\_4x,20}(2{:}1{:}122),a27,a28,\\c7*\text{VHTLTF\_4x,20}(-122{:}1{:}-2),\\c8*\text{VHTLTF\_4x,20}(2{:}1{:}122)\} \quad \text{<Equation 14>}$$

Moreover, the modification shown below is also possible. More specifically, the following configuration may be made by using one Barker sequence having a length of 13 (marked as B13) and one extra value on each side. The 13-length Barker sequence that is being inserted on each of the left side and right side of the center frequency is defined as shown below in Equation 16.

$$\text{HELTF\_4x,80}(-500{:}1{:}500)=\{c1*\text{VHTLTF\_4x,20}(-122{:}1{:}-2),c2*\text{VHTLTF\_4x,20}(2{:}1{:}122),\\c3*\text{VHTLTF\_4x,20}(-122{:}1{:}-2),\\c4*\text{VHTLTF\_4x,20}(2{:}1{:}122),c5*B13,a1,0,0,0,0,\\0,a2,c6*B13,c7*\text{VHTLTF\_4x,20}(-122{:}1{:}-2),\\c8*\text{VHTLTF\_4x,20}(2{:}1{:}122),c9*\text{VHTLTF\_4x,20}(-122{:}1{:}-2),c10*\text{VHTLTF\_4x,20}(2{:}1{:}122)\} \quad \text{<Equation 15>}$$

$$B13=\{1,1,1,1,1,-1,-1,1,1,-1,1,-1,1\} \quad \text{<Equation 16>}$$

The fact that the detailed positions of VHTLTF_4x,20(−122:1:−2) and VHTLTF_4x,20(2:1:122) may be varied, and that the element of the B13 sequence may also be changed, and that the positions of a1/a2 may also be changed is the same as the above-described example, and such positions may be optimized based on the PAPR.

1-D) 160 MHz

For the 160 MHz transmission, the HELTF_4x,80 may be repeated two times. The respective example is shown below in detail.

$$\text{HELTF\_4x,160}=\{\text{HELTF\_4x,80},\text{HELTF\_4x,80}\} \quad \text{<Equation 17>}$$

Example (2)—2×HE-LTF

Hereinafter, an example of a 2×HE-LTF will be proposed. More specifically, Example (2), which will hereinafter be described in detail, proposes diverse types of LTF sequences for the 20 MHz, 40 MHz, and 80 MHz transmissions.

2-A) 20 MHz

The length respective to each of the negative and positive sequences for HELTF_2x,20 may each be equal to 61. In this case, 61 units may be taken (or cut out) from each of the left/right sides of the HELTF_4x,20 (or VHTLTF_80) and may then be used. A detailed example of the HELTF_2x,20 is as shown below.

$$\text{HELTF\_2x,20}(-122{:}2{:}122)=\{c1*\text{VHTLTF\_4x,20}(-122{:}1{:}-62),0,c2*\text{VHTLTF\_4x,20}(62{:}1{:}122)\}$$

$$\text{HELTF\_2x,20}(-122{:}2{:}122)=\{c1*\text{VHTLTF\_4x,20}(-122{:}1{:}-62),0,c2*\text{VHTLTF\_4x,20}(2{:}1{:}62)\}$$

$$\text{HELTF\_2x,20}(-122{:}2{:}122)=\{c1*\text{VHTLTF\_4x,20}(-62{:}1{:}-2),0,c2*\text{VHTLTF\_4x,20}(2{:}1{:}62)\}$$

$$\text{HELTF\_2x,20}(-122{:}2{:}122)=\{c1*\text{VHTLTF\_4x,20}(-62{:}1{:}-2),0,c2*\text{VHTLTF\_4x,20}(62{:}1{:}122)\} \quad \text{<Equation 18>}$$

Among the sequences indicated in Equation 18, which is presented above, any one of the sequences may be used. Alternatively, as shown in the following Equation, by using the sequence on only one of the left/right sides, a sequence for the 20 MHz transmission may be configured.

$$\text{HELTF\_2x,20}(-122{:}2{:}122)=\{c1*\text{VHTLTF\_4x,20}(-122{:}1{:}-62),0,c2*\text{VHTLTF\_4x,20}(-62{:}1{:}-2)\}$$

$$\text{HELTF\_2x,20}(-122{:}2{:}122)=\{c1*\text{VHTLTF\_4x,20}(-62{:}1{:}-2),0,c2*\text{VHTLTF\_4x,20}(-122{:}1{:}-62)\}$$

$$\text{HELTF\_2x,20}(-122{:}2{:}122)=\{c1*\text{VHTLTF\_4x,20}(62{:}1{:}122),0,c2*\text{VHTLTF\_4x,20}(2{:}1{:}62)\}$$

$$\text{HELTF\_2x,20}(-122{:}2{:}122)=\{c1*\text{VHTLTF\_4x,20}(2{:}1{:}62),0,c2*\text{VHTLTF\_4x,20}(62{:}1{:}122)\} \quad \text{<Equation 19>}$$

Among the sequences indicated in Equation 19, which is presented above, any one of the sequences may be used.

Alternatively, as shown in the following Equation, by using the sequence on only one of the left/right sides and by inserting at least one extra value (indicated as "a"), a sequence for the 20 MHz transmission may be configured.

$$HELTF\_2x,20(-122:2:122)=\{c1*VHTLTF\_4x,20(-122:1:-62),0,c2*VHTLTF\_4x,20(-61:1:-2),a\}$$

$$HELTF\_2x,20(-122:2:122)=\{c1*VHTLTF\_4x,20(-122:1:-62),0,a,c2*VHTLTF\_4x,20(-61:1:-2)\}$$

$$HELTF\_2x,20(-122:2:122)=\{a,c1*VHTLTF\_4x,20(-122:1:-63),0,c2*VHTLTF\_4x,20(-62:1:-2)\}$$

$$HELTF\_2x,20(-122:2:122)=\{c1*VHTLTF\_4x,20(-122:1:-63),a,0,c2*VHTLTF\_4x,20(-62:1:-2)\} \quad <\text{Equation 20}>$$

$$HELTF\_2x,20(-122:2:122)=\{c1*VHTLTF\_4x,20(2:1:62),0,c2*VHTLTF\_4x,20(63:1:122),a\}$$

$$HELTF\_2x,20(-122:2:122)=\{c1*VHTLTF\_4x,20(2:1:62),0,a,c2*VHTLTF\_4x,20(63:1:122)\}$$

$$HELTF\_2x,20(-122:2:122)=\{a,c1*VHTLTF\_4x,20(2:1:61),0,c2*VHTLTF\_4x,20(62:1:122)\}$$

$$HELTF\_2x,20(-122:2:122)=\{c1*VHTLTF\_4x,20(2:1:61),a,0,c2*VHTLTF\_4x,20(62:1:122)\} \quad <\text{Equation 21}>$$

Among the sequences indicated in Equation 20 and Equation 21, which are presented above, any one of the sequences may be used. Alternatively, as shown in the following Equation, by selecting the length of the sequence on only one of the left/right sides as 60 or 61 and by inserting at least one extra value (indicated as "a"), a sequence for the 20 MHz transmission may be configured.

$$HELTF\_2x,20(-122:2:122)=\{c1*VHTLTF\_4x,20(-122:1:-63),a,0,c2*VHTLTF\_4x,20(62:1:122)\}$$

$$HELTF\_2x,20(-122:2:122)=\{a,c1*VHTLTF\_4x,20(-122:1:-63),0,c2*VHTLTF\_4x,20(62:1:122)\}$$

$$HELTF\_2x,20(-122:2:122)=\{c1*VHTLTF\_4x,20(-61:1:-2),a,0,c2*VHTLTF\_4x,20(62:1:122)\}$$

$$HELTF\_2x,20(-122:2:122)=\{a,c1*VHTLTF\_4x,20(-61:1:-2),0,c2*VHTLTF\_4x,20(62:1:122)\} \quad <\text{Equation 22}>$$

$$HELTF\_2x,20(-122:2:122)=\{c1*VHTLTF\_4x,20(-122:1:-63),a,0,c2*VHTLTF\_4x,20(2:1:62)\}$$

$$HELTF\_2x,20(-122:2:122)=\{a,c1*VHTLTF\_4x,20(-122:1:-63),0,c2*VHTLTF\_4x,20(2:1:62)\}$$

$$HELTF\_2x,20(-122:2:122)=\{c1*VHTLTF\_4x,20(-61:1:-2),a,0,c2*VHTLTF\_4x,20(2:1:62)\}$$

$$HELTF\_2x,20(-122:2:122)=\{a,c1*VHTLTF\_4x,20(-61:1:-2),0,c2*VHTLTF\_4x,20(2:1:62)\} \quad <\text{Equation 23}>$$

$$HELTF\_2x,20(-122:2:122)=\{c1*VHTLTF\_4x,20(-122:1:-62),0,a,c2*VHTLTF\_4x,20(2:1:61)\}$$

$$HELTF\_2x,20(-122:2:122)=\{c1*VHTLTF\_4x,20(-122:1:-62),0,c2*VHTLTF\_4x,20(2:1:61),a\}$$

$$HELTF\_2x,20(-122:2:122)=\{c1*VHTLTF\_4x,20(-122:1:-62),0,a,c2*VHTLTF\_4x,20(63:1:122)\}$$

$$HELTF\_2x,20(-122:2:122)=\{c1*VHTLTF\_4x,20(-122:1:-62),0,c2*VHTLTF\_4x,20(63:1:122),a\} \quad <\text{Equation 24}>$$

$$HELTF\_2x,20(-122:2:122)=\{c1*VHTLTF\_4x,20(-62:1:-2),0,a,c2*VHTLTF\_4x,20(2:1:61)\}$$

$$HELTF\_2x,20(-122:2:122)=\{c1*VHTLTF\_4x,20(-62:1:-2),0,c2*VHTLTF\_4x,20(2:1:61),a\}$$

$$HELTF\_2x,20(-122:2:122)=\{c1*VHTLTF\_4x,20(-62:1:-2),0,a,c2*VHTLTF\_4x,20(63:1:122)\}$$

$$HELTF\_2x,20(-122:2:122)=\{c1*VHTLTF\_4x,20(-62:1:-2),0,c2*VHTLTF\_4x,20(63:1:122),a\} \quad <\text{Equation 25}>$$

$$HELTF\_2x,20(-122:2:122)=\{c1*VHTLTF\_4x,20(-122:1:-63),a1,0,a2,c2*VHTLTF\_4x,20(63:1:122)\}$$

$$HELTF\_2x,20(-122:2:122)=\{a1,c1*VHTLTF\_4x,20(-122:1:-63),0,c2*VHTLTF\_4x,20(63:1:122),a2\}$$

$$HELTF\_2x,20(-122:2:122)=\{c1*VHTLTF\_4x,20(-122:1:-63),a1,0,a2,c2*VHTLTF\_4x,20(2:1:61)\}$$

$$HELTF\_2x,20(-122:2:122)=\{a1,c1*VHTLTF\_4x,20(-122:1:-63),0,c2*VHTLTF\_4x,20(2:1:61),a2\} \quad <\text{Equation 26}>$$

$$HELTF\_2x,20(-122:2:122)=\{c1*VHTLTF\_4x,20(-61:1:-2),a1,0,a2,c2*VHTLTF\_4x,20(63:1:122)\}$$

$$HELTF\_2x,20(-122:2:122)=\{a1,c1*VHTLTF\_4x,20(-61:1:-2),0,c2*VHTLTF\_4x,20(63:1:122),a2\}$$

$$HELTF\_2x,20(-122:2:122)=\{c1*VHTLTF\_4x,20(-61:1:-2),a1,0,a2,c2*VHTLTF\_4x,20(2:1:61)\}$$

$$HELTF\_2x,20(-122:2:122)=\{a1,c1*VHTLTF\_4x,20(-61:1:-2),0,c2*VHTLTF\_4x,20(2:1:61),a2\} \quad <\text{Equation 27}>$$

Just as in the above-described Example (1), the values of $c1$, $c2$, and so on, in the equations presented above may be configured as BPSK values, and the positions of a sequence part having the length of 60 to 61 and extra values ($a1$, $a2$), and so on, may be changed (or varied), and the positions may be optimized based on the PAPR.

2-B) 40 MHz

The sequence length of $HELTF\_2x,40$ may be equal to 242. In this case, the sequence may be configured by using the $HELTF\_4x,20$ (or $VHTLTF\_80$) once. The respective example is shown below in detail.

$$HELTF\_2x,40(-244:2:244)=HELTF\_4x,20(-122:1:122) \quad <\text{Equation 28}>$$

Alternatively, as shown below, a sequence having an additional arithmetic calculation applied thereto may be used.

$$HELTF\_2x,40(-244:2:244)=\{c1*VHTLTF\_4x,20(-122:1:-2),0,0,0,c2*VHTLTF\_4x,20(2:1:122)\} \quad <\text{Equation 29}>$$

Just as in the above-described Example (1), the values of $c1$, $c2$, and so on, in the equations presented above may be configured as BPSK values, and the positions of $VHTLTF\_4x,20(-122:1:-2)$ and $VHTLT\_F4x,20(2:1:122)$ may be changed (or varied), and the positions may be optimized based on the PAPR.

2-C) 80 MHz

The negative and positive sequence lengths of $HELTF\_2x,80$ may each be equal to 249. Accordingly, the sequence for a 80 MHz transmission may be configured by using the $HELTF\_4x,20$ (or $VHTLTF\_80$) twice. A detailed example of $HELTF\_2x,80$ is as shown below.

$$HELTF\_2x,80(-500:2:500)=\{c1*VHTLTF\_4x,20(-122:1:-2),c2*VHTLTF\_4x,20(2:1:122), a1,a2,\ldots,a7,0,0,0,a8,a9,\ldots,a14, c3*VHTLTF\_4x,20(-122:1:-2), c4*VHTLTF\_4x,20(2:1:122)\} \quad <\text{Equation 30}>$$

Alternatively, instead of the seven (7) extra values on each side (a1 to a7 or a8 to a14), a Barker sequence having a length of 7 (marked as B7) may be used. A detailed example is as shown below.

HELTF_2x,80(−500:2:500)={c1*VHTLTF_4x,20(−122:1:−2),c2*VHTLTF_4x,20(2:1:122),c3*B7,0, 0,0,c4*B7,c5*VHTLTF_4x,20(−122:1:−2), c6*VHTLTF_4x,20(2:1:122} <Equation 31>

B7={1,1,1,−1,−1,1,−1} <Equation 32>

Just as in the above-described Example (1), the values of c1, c2, and so on, in the equations presented above may be configured as BPSK values, and the positions of the inserted sequences or the positions of the extra values may be changed (or varied), and the positions may be optimized based on the PAPR.

2-D) 160 MHz

An example of configuring a sequence for a 160 MHz transmission by repeating HELTF_2x,80 twice is proposed herein.

HELTF_2x,160={HELTF_2x,80,HELTF_2x,80} <Equation 33>

A PAPR performance respective to a sequence according to the above-described method will hereinafter be described in detail. More specifically, the PAPR respective to the 4×HE-LTF sequence, which is indicated in Equation 34 to Equation 36 shown below, will be described in detail. The VHTLTF_80 that is indicated in Equation 34 shown below may correspond to a sequence having a gamma value of a VHT wireless LAN system applied thereto.

HELTF_4x,20(−122:1:122)=VHTLTF_80(−122:1:122) <Equation 34>

An example of a sequence for a 40 MHz transmission is configured by using a method of repeating part of the sequence shown in Equation 34, and the corresponding example is as shown below.

HELTF_4x,40(−244:1:244)={HELTF_left,HELTF_right,0,0,0,0,0,HELTF_left,−HELTFright}, HELTF_left=HELTF_4x,20(−122:1:−2)

HELTF_right=HELTF_4x,20(2:1:122) <Equation 35>

An example of the sequence for a 80 MHz transmission is configured as the equation shown below by using a sequence part of Equation 34 and a Barker Sequence having a length of 13 (indicated as B13).

HELTF_4x,80(−500:1:500)={HELTF_left,HELTF_right,−HELTF_left,HELTF_right,−B13,1,0,0, 0,0,0,−1,B13,−HELTF_left,−HELTF_right,−HELTF_left,HELTF_right}, B13={1,1,1,1,1,−1,−1,1,1,−1,1,−1,1} <Equation 36>

FIG. 13 illustrates a drawing indicating in units of resource units (RUs) a PAPR of a 4×HE-LTF sequence that is being used for a 20 MHz transmission. Each block of FIG. 13 corresponds to a RU for the 20 MHz transmission shown in FIG. 4. The PAPR indicated in FIG. 13 indicates a PAPR of the sequence of Equation 34.

Figure 14:
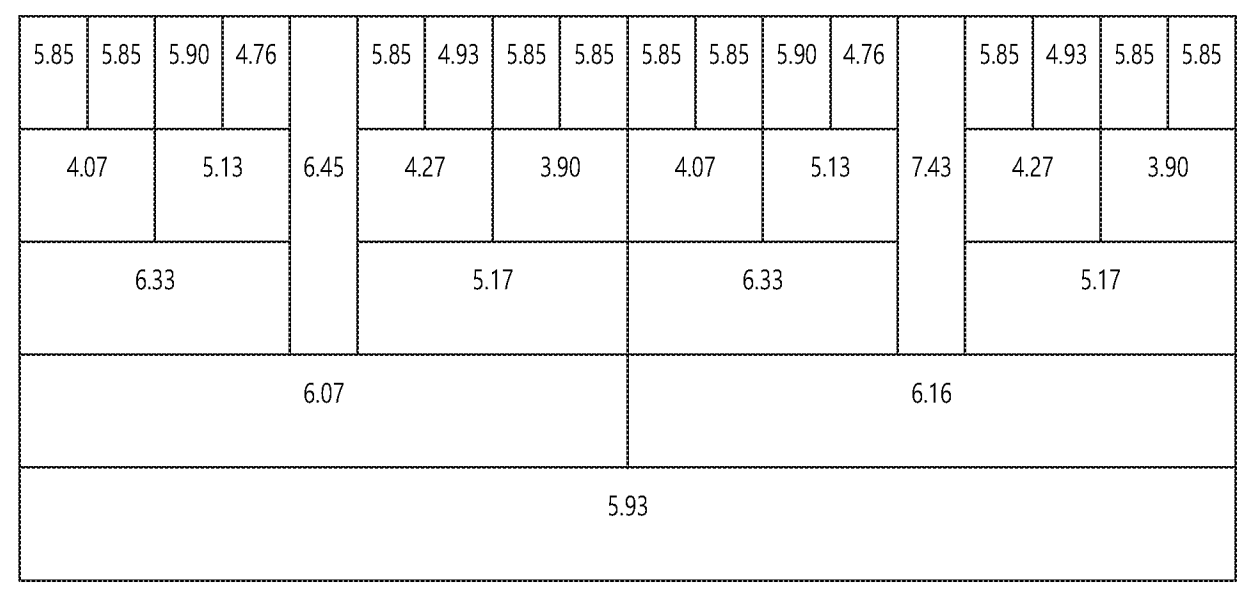

FIG. 14 illustrates a drawing indicating in units of resource units (RUs) a PAPR of a 4×HE-LTF sequence that is being used for a 40 MHz transmission. Each block of FIG. 14 corresponds to a RU for the 40 MHz transmission shown in FIG. 5. The PAPR indicated in FIG. 14 indicates a PAPR of the sequence of Equation 35.

Figure 16:
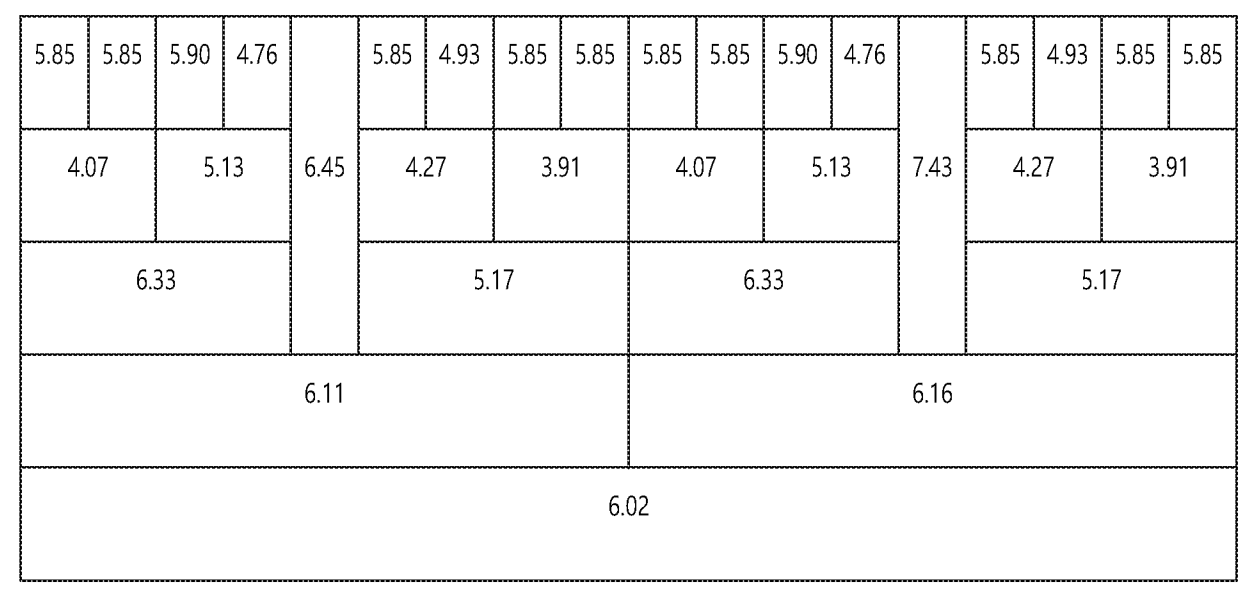

FIG. 15 and FIG. 16 illustrate drawings indicating in units of resource units (RUs) a PAPR of a 4×HE-LTF sequence that is being used for a 80 MHz transmission. Each block of FIG. 15 and FIG. 16 corresponds to a RU for the 80 MHz transmission shown in FIG. 6. More specifically, FIG. 15 illustrates a left-side band of the center frequency, and FIG. 16 illustrates a right-side band of the center frequency. The PAPR indicated in FIG. 15 and FIG. 16 indicates a PAPR of the sequence of Equation 36.

The PAPR respective to center 26-RU is omitted from FIG. 15 and FIG. 16, and, more specifically, the PAPR is calculated as 4.52. Additionally, the PAPR respective to the entire band is calculated as 5.85.

Hereinafter, the PAPR respective to the 2×HE-LTF sequence, which is indicated in Equation 37 to Equation 39 shown below, will be described in detail. An example of Equation 37 shown below is configured for a 20 MHz transmission, and the example presented herein uses part of HELTF_left and HELTF_right, which are described in Equation 35.

HELTF_2x,20(−122:2:122)={HELTF_left(61:1:121), 0,HELTF_right(1:1:61)} <Equation 37>

An example of the sequence for a 40 MHz transmission uses HELTF_left and HELTF_right, which are described in the description of Equation 35, and the exemplary sequence is as shown below in the following equation.

HELTF_2x,40(−244:2:244)={HELTF_left,0,0,0,HELTF_right} <Equation 38>

An example of the sequence for a 80 MHz transmission is configured as the equation shown below by using HELTF_left and HELTF_right, which are described in Equation 35, and a Barker Sequence having a length of 7 (indicated as B7).

HELTF_2x,80(−500:2:500)={HELTF_left,HELTF_right,B7,0,0,0,B7,HELTF_left,−HELTFright}, <Equation 39>

B7={1, 1, 1, −1, −1, 1, −1}

FIG. 17 illustrates a drawing indicating in units of resource units (RUs) a PAPR of a 2×HE-LTF sequence that is being used for a 20 MHz transmission. Each block of FIG. 17 corresponds to a RU for the 20 MHz transmission shown in FIG. 4. The PAPR indicated in FIG. 17 indicates a PAPR of the sequence of Equation 37.

Figure 18:
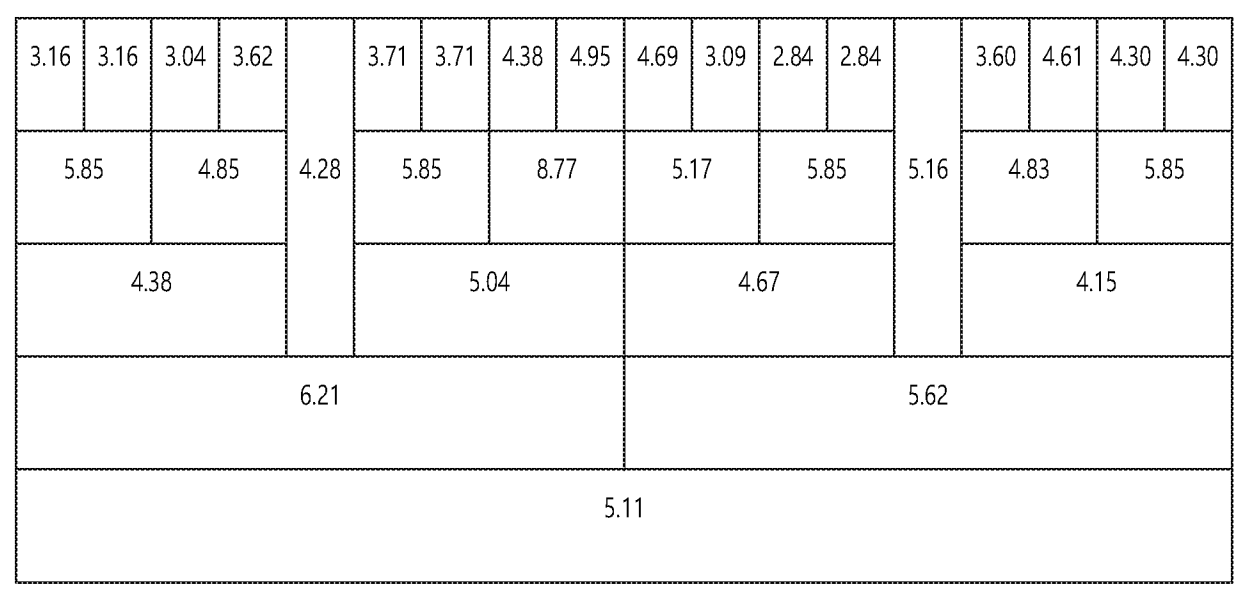

FIG. 18 illustrates a drawing indicating in units of resource units (RUs) a PAPR of a 2×HE-LTF sequence that is being used for a 40 MHz transmission. Each block of FIG. 18 corresponds to a RU for the 40 MHz transmission shown in FIG. 5. The PAPR indicated in FIG. 18 indicates a PAPR of the sequence of Equation 38.

Figure 19:
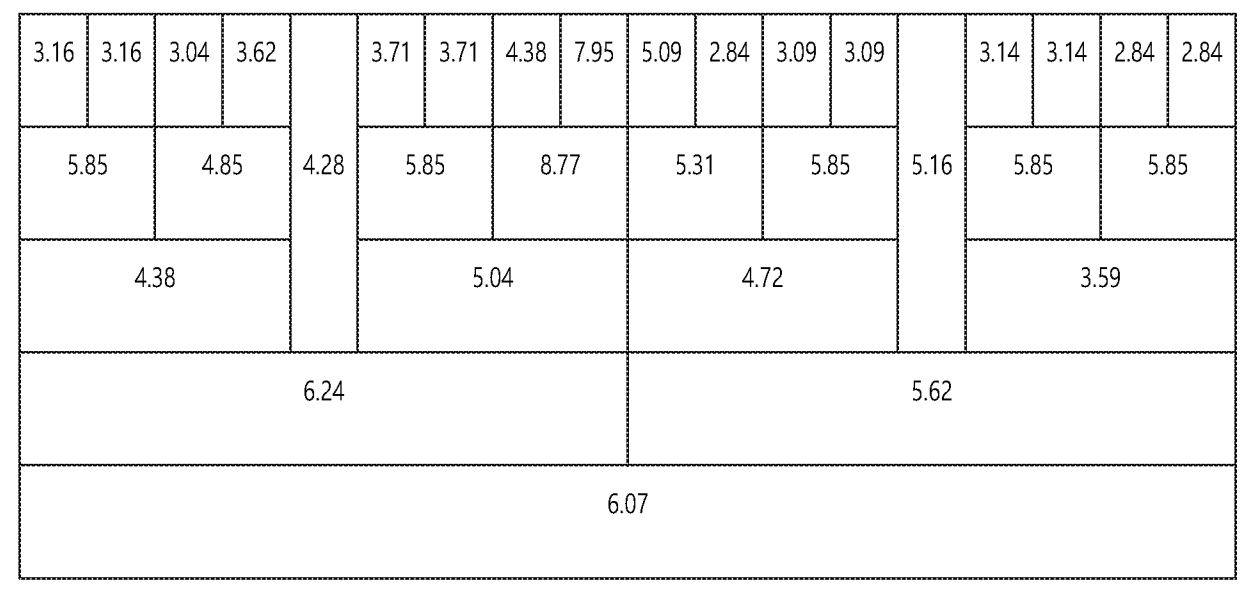

FIG. 19 and FIG. 20 illustrate drawings indicating in units of resource units (RUs) a PAPR of a 2×HE-LTF sequence that is being used for a 80 MHz transmission. Each block of FIG. 19 and FIG. 20 corresponds to a RU for the 80 MHz transmission shown in FIG. 6. More specifically, FIG. 19 illustrates a left-side band of the center frequency, and FIG. 20 illustrates a right-side band of the center frequency. The PAPR indicated in FIG. 19 and FIG. 20 indicates a PAPR of the sequence of Equation 39.

The PAPR respective to center 26-RU is omitted from FIG. 19 and FIG. 20, and, more specifically, the PAPR is calculated as 4.39. Additionally, the PAPR respective to the entire band is calculated as 5.86.

Figure 21:
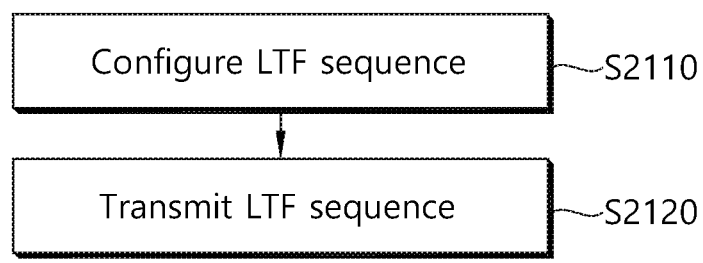
FIG. 21 illustrates a flow chart of a procedure according to an example of this specification.

FIG. 21 illustrates a flow chart of a procedure according to an example of this specification.

An example of this specification relates to a sequence for two different wireless LAN systems. For example, a second wireless LAN system may signify a HEW system or an IEEE 802.11ax system, and a first wireless LAN system may signify a VHT system or an IEEE 802.11ax system.

More specifically, as shown in step S2110, in a transmitting device, a long training field (LTF) sequence for a second frequency band of a second wireless LAN system by using a LTF sequence for a first frequency band of a first wireless LAN system. The transmitting device may correspond to an AP or a non-AP STA. Herein, for example, the first frequency band may signify a 80 MHz band, and a second frequency band may signify a 20 MHz or 40 MHz band. For example, a long training field (LTF) sequence for the first frequency band of the first wireless LAN system may correspond to a VHTLTF_80 sequence, and a LTF for the second frequency band of the second wireless LAN system may correspond to HELTF_4×, 20 or HELTF_4×, 40. Additionally, a specific sequence may correspond to any one of the equations presented in the above-described example of the present invention.

As shown in step S2120, the transmitting device may transmit a LTF for the second frequency band through a Physical layer Protocol Data Unit (PPDU), which includes a first field area and a second field area. The PPDU may include all or any part of the fields shown in FIG. 7. The second field area may include a STF, a LTF, and a data field, and the first field area may include all or any part of the fields before the STF.

Figure 22:
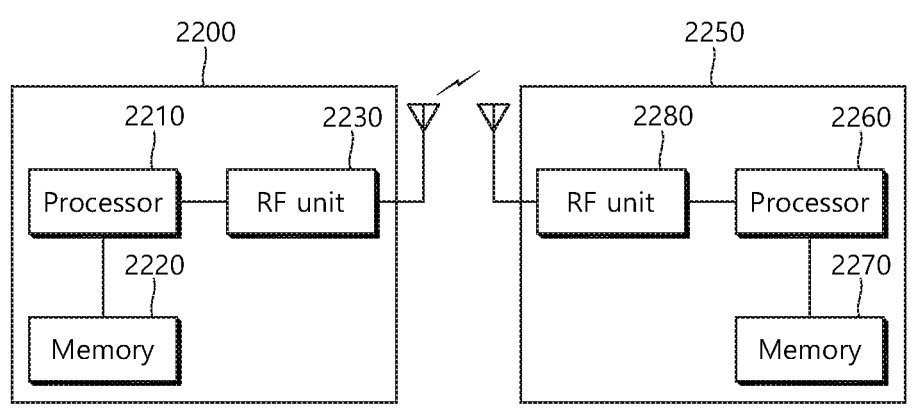
FIG. 22 illustrates a block diagram showing a wireless communication system in which the example of this specification can be applied.

FIG. 22 illustrates a block diagram showing a wireless communication system in which the example of this specification can be applied.

Referring to FIG. 22, as a station (STA) that can realize the above-described exemplary embodiment, the wireless device may correspond to an AP or a non-AP station (non-AP STA). The wireless device may correspond to the above0described user or may correspond to a transmitting device transmitting a signal to the user.

The AP 2200 includes a processor 2210, a memory 2220, and a radio frequency unit (RF unit) 2230.

The RF unit 2230 is connected to the processor 2210, thereby being capable of transmitting and/or receiving radio signals.

The processor 2210 implements the functions, processes, and/or methods proposed in this specification. For example, the processor 2210 may be realized to perform the operations according to the above-described exemplary embodiments of the present invention. More specifically, the processor 2210 may perform the operations that can be performed by the AP, among the operations that are disclosed in the exemplary embodiments of FIG. 1 to FIG. 21.

The non-AP STA 2250 includes a processor 2260, a memory 2270, and a radio frequency unit (RF unit) 2280.

The RF unit 2280 is connected to the processor 2260, thereby being capable of transmitting and/or receiving radio signals.

The processor 2260 may implement the functions, processes, and/or methods proposed in the exemplary embodiment of the present invention. For example, the processor 2260 may be realized to perform the non-AP STA operations according to the above-described exemplary embodiments of the present invention. The processor may perform the operations of the non-AP STA, which are disclosed in the exemplary embodiments of FIG. 1 to FIG. 21.

The processor 2210 and 2260 may include an application-specific integrated circuit (ASIC), another chip set, a logical circuit, a data processing device, and/or a converter converting a baseband signal and a radio signal to and from one another. The memory 2220 and 2270 may include a read-only memory (ROM), a random access memory (RAM), a flash memory, a memory card, a storage medium, and/or another storage device. The RF unit 2230 and 2280 may include one or more antennas transmitting and/or receiving radio signals.

When the exemplary embodiment is implemented as software, the above-described method may be implemented as a module (process, function, and so on) performing the above-described functions. The module may be stored in the memory 2220 and 2270 and may be executed by the processor 2210 and 2260. The memory 2220 and 2270 may be located inside or outside of the processor 2210 and 2260 and may be connected to the processor 2210 and 2260 through a diversity of well-known means.

As described above, the method and apparatus for configuring a Long Training Field (LTF) in a wireless LAN system have the following advantages.

A method according to an example of this specification proposes an example of configuring a LTF sequence of a new wireless LAN system by using a LTF sequence that is being used in another wireless LAN system.

According to an exemplary of this specification, the present invention has an advantageous effect of decreasing the level of complexity in designing a LTF sequence in a new system.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method for configuring a Long Training Field (LTF) in a wireless LAN system, comprising:
    configuring, by a transmitting apparatus, a LTF for a second frequency band of a second wireless LAN system by using a LTF sequence for a first frequency band of a first wireless LAN system; and
    transmitting, by the transmitting apparatus, the LTF for the second frequency band through a Physical layer Protocol Data Unit (PPDU) including a first field area and a second field area,
    wherein the second field area includes the LTF and a data field for the second frequency band,
    wherein an Inverse Discrete Fourier Transform (IDFT)/ Discrete Fourier Transform (DFT) period being applied to each symbol of the first field area is shorter than an IDFT/DFT period being applied to each symbol of the second field area, and
    wherein a bandwidth of the first frequency band is larger than a bandwidth of the second frequency band.

2. The method of claim 1, wherein the LTF sequence for the first frequency band corresponds to a Very High Throughput (VHT) LTF sequence, wherein the LTF for the second frequency band corresponds to a High Efficiency (HE) LTF, and wherein the PPDU corresponds to a HE PPDU.

3. The method of claim 1, wherein the bandwidth of the first frequency band is equal to 80 MHz, and wherein the bandwidth of the second frequency band is equal to 20 MHz.

4. The method of claim 1, wherein the IDFT/DFT period being applied to each symbol of the first field area is 2 times or 4 times shorter than the IDFT/DFT period being applied to each symbol of the second field area.

5. The method of claim 1, wherein, in case the IDFT/DFT period being applied to each symbol of the first field area is 4 times shorter than the IDFT/DFT period being applied to each symbol of the second field area, and in case the bandwidth of the first frequency band is equal to 80 MHz and the bandwidth of the second frequency band is equal to 20 MHz, the LTF for the second frequency band is configured by using a LTF sequence for the first frequency band.

6. The method of claim 5, wherein, in case the IDFT/DFT period being applied to each symbol of the first field area is 4 times shorter than the IDFT/DFT period being applied to each symbol of the second field area, and in case the bandwidth of the first frequency band is equal to 80 MHz and the bandwidth of the second frequency band is equal to 40 MHz, the LTF for the second frequency band is configured by repeating the LTF sequence for the first frequency band.

7. A transmitting apparatus for configuring a Long Training Field (LTF) in a wireless LAN system, comprising:

a radio frequency unit (RF unit) configured to transmit or receive radio signals; and a processor configured to control the RF unit, wherein the processor:

configures a LTF for a second frequency band of a second wireless LAN system by using a LTF sequence for a first frequency band of a first wireless LAN system, and transmits the LTF for the second frequency band through a Physical layer Protocol Data Unit (PPDU) including a first field area and a second field area, wherein the second field area includes the LTF and a data field for the second frequency band, wherein an Inverse Discrete Fourier Transform (IDFT)/Discrete Fourier Transform (DFT) period being applied to each symbol of the first field area is shorter than an IDFT/DFT period being applied to each symbol of the second field area, and wherein a bandwidth of the first frequency band is larger than a bandwidth of the second frequency band.

* * * * *